UNITED STATES PATENT OFFICE.

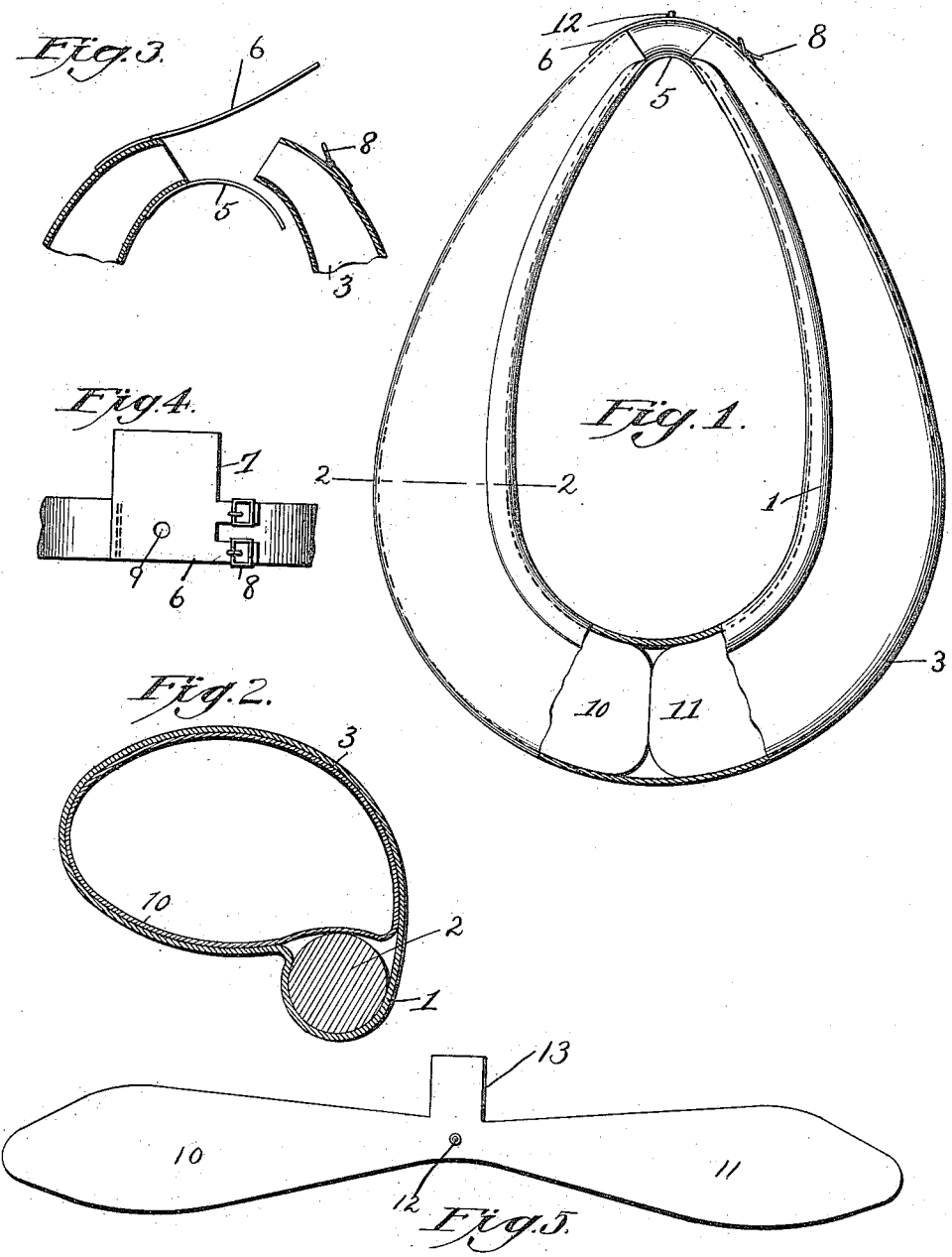

JOHN F. PRUDEN, OF CARNEGIE, PENNSYLVANIA.

INFLATABLE HORSE-COLLAR.

1,080,848.

Specification of Letters Patent. Patented Dec. 9, 1913.

Application filed July 29, 1913. Serial No. 781,852.

*To all whom it may concern:*

Be it known that I, JOHN F. PRUDEN, a citizen of the United States, residing at Carnegie, in the county of Allegheny and State of Pennsylvania, have invented certain new and useful Improvements in Inflatable Horse-Collars, of which the following is a specification, reference being had therein to the accompanying drawing.

This invention relates to certain new and useful improvements in horse collars and has for its object, the provision of a collar in the form of a casing in which is adapted to be arranged, an inflatable bladder having wing portions adapted to extend into the casing from the top; said wing portions being connected and provided with an enlarged portion forming a neck pad for supporting the collar in position upon the neck of the animal in such a manner that the animal will not be injured by the use of a collar constructed as disclosed.

Another object of the invention is to provide a collar with an open top having flaps connecting the ends thereof; said collar being capable of receiving the wings of the bladder when in a collapsed condition, the means for inflating the bladder being arranged at the junction of the wings and in such position that the same can be readily inflated.

I am aware that I am not the first in the art to provide an inflatable horse collar, but in collars of this character now in use, the bladder or inflatable members are arranged within the body of the collar in such a manner that it is impossible to readily insert and detach the same and in no instance, am I aware that a collar has been provided with a lateral extension at the meeting ends thereof, to form a cushion at the point of contact with the animal's neck to which the collar is attached. I am also not aware that a collar has been provided with an inflatable bag having an inflating valve at the junction of a pair of wings which extends through one of the flaps in such a manner that it can be readily reached and connected to a suitable inflating device.

In constructing a collar in accordance with my invention, the ordinary collar now in use can be altered by the mere removal of the padding and the addition of flaps in such a manner that a bladder can be inserted.

Other and further objects and advantages of the invention will be hereinafter set forth and the novel features thereof defined by the appended claims.

In the drawing—Figure 1, is a front elevation of a collar constructed in accordance with my invention, partly broken away to show the abutting ends of the wings of the inflatable bag; Fig. 2, is a section taken on the line 2—2 of Fig. 1; Fig. 3, is a detail section of the upper portion of the collar showing the flaps; Fig. 4, is a top plan of a portion of the collar; and Fig. 5, is a plan of the bladder, detached.

Like numerals of reference refer to like parts in the several figures of the drawings.

In the drawing, I have shown a collar in the form of a casing comprising the forewale 1 having a stiffening member 2 arranged therein and the afterwale 3 hollow; said collar being preferably formed of leather and with the afterwales terminating spaced apart and opened, as shown in Fig. 3. This form of collar is now in use with means for fastening the ends together at the point above, and while I have shown particular fastening means, it is of course understood that the only essential feature of the fastening means of a collar constructed in accordance with my invention, is to provide flaps which rest upon the neck of the animal to which the collar is attached.

Secured to one end of the collar is an inner flap 5 which extends laterally and rearwardly and is adapted to close the gap between the spaced ends and rest upon the neck of the animal. The outer flap 6 is secured to the same end of the collar and is of substantially the same shape having a portion 7 overlapping the opposite end of the collar and is bifurcated to form straps as clearly shown. These straps are adapted to be fastened in suitable buckles 8 arranged upon the opposite end of the collar as clearly shown, to fasten the open end of the collar together and the upper flap is provided with an opening 9 for the purpose later described.

The filler of the afterwale of the collar is in the form of a bladder having wing portions 10 and 11 which are adapted to be inserted into the open ends of the collar when in a collapsed condition and at the junction of the wings, the bladder is provided with an inflating valve 12 which extends through the opening 9 above the collar in such a position that it can be readily reached in order to inflate the bladder after the same has been placed in position within the casing of the collar. At the junction of the two wings of the bladder, I provide a lateral extension 13 which forms the most essential feature of my invention, and is adapted to rest between the inner and outer flaps 5 and 6 and be protected thereby in such a manner that an air cushion is formed at the point of contact of the collar with the neck of the animal to which the collar is attached, whereby the rubbing of the mane of the animal is avoided and a collar is provided which is exceedingly simple and cheap in construction and one which can be readily placed in position upon an animal.

It will be seen that by providing the collar with flaps, a housing is formed for the upper and lower portion of the inflatable extension of the bladder to form a neck pad and that the supporting surface at the point of contact of the collar with the neck of the animal is increased in such a manner that the difficulties now existing with collars are overcome and that a collar is provided which is so constructed that it can be readily placed in position upon the neck of the animal by slipping the same over the head; the connecting portions of the wings of the bladder yielding, whereby a substantially one-piece collar is formed after the bladder is placed in position which will avoid the necessity of operating any fastening means for holding the open ends of the collar together.

I am aware that a closed collar has been formed previous to the adoption of my invention, but in no instance am I aware that a closed collar has been formed with an elastic portion allowing the same to stretch in order to be slipped over the head of the animal.

I claim:

1. A horse collar comprising a casing having open ends, an inflatable bladder formed with wings extending into said casing, said bladder having an extension at the junction of said wings.

2. A horse collar having fore and after wales, a stiffening member arranged in the forewale, said afterwale being hollow, an inflatable bladder arranged within said hollow afterwale, said bladder having an extension forming a neck pad.

3. A horse collar comprising a casing having open ends, an inflatable bladder having wings arranged within said casing and having an extension at the junction of said wings arranged between the ends of said casing, an inflating valve carried by said bladder at the junction of said wings, and inner and outer flaps carried by one end of said casing extending over and under said extension.

4. A horse collar comprising a casing provided with open ends, inner and outer flaps carried by one of said ends, means for connecting the outer flap to the opposite end of said casing, said outer flap being provided with an extension, and an inflatable bladder having wings extending into said casing, said bladder having an extension arranged under the extension of said outer flap, and an inflating valve carried by said bladder at the junction of said wings extending upwardly through the outer flap.

In testimony whereof I affix my signature in presence of two witnesses.

JOHN F. PRUDEN.

Witnesses:
J. S. WECKMAN,
A. A. BEARD.